United States Patent [19]

Nishida

[11] Patent Number: 4,878,771
[45] Date of Patent: Nov. 7, 1989

[54] LABEL PRINTER

[75] Inventor: Manabu Nishida, Shizuoka, Japan

[73] Assignee: Tokyo Electric Company, Ltd., Tokyo, Japan

[21] Appl. No.: 212,159

[22] Filed: Jun. 24, 1988

Related U.S. Application Data

[63] Continuation of Ser. No. 50,566, May 18, 1987, abandoned.

[30] Foreign Application Priority Data

May 22, 1986 [JP] Japan ................................ 61-118135

[51] Int. Cl.$^4$ .............................................. B41J 5/31
[52] U.S. Cl. ..................................... 400/70; 101/28.8; 364/403; 400/103
[58] Field of Search ..................... 400/103, 73, 76, 70; 101/288; 364/403; 177/4

[56] References Cited

U.S. PATENT DOCUMENTS

| | | | |
|---|---|---|---|
| 4,262,591 | 4/1981 | Cook | 101/327 |
| 4,264,396 | 4/1981 | Stewart | 101/288 |
| 4,493,037 | 1/1985 | Takano et al. | 364/404 |
| 4,509,123 | 4/1985 | Vereen | 364/403 |
| 4,583,345 | 4/1986 | Hirosaki et al. | 53/77 |
| 4,598,780 | 7/1986 | Iwasaki et al. | 177/4 |
| 4,652,317 | 3/1987 | Seestrom | 101/288 |
| 4,656,591 | 4/1987 | Goldberg | 364/403 |

FOREIGN PATENT DOCUMENTS

| | | |
|---|---|---|
| 2260312 | 6/1973 | Fed. Rep. of Germany . |
| 3104180 | 12/1981 | Fed. Rep. of Germany . |
| 3332066 | 3/1984 | Fed. Rep. of Germany . |
| 44878 | 3/1980 | Japan ................................ 101/288 |
| 124678 | 9/1980 | Japan ................................ 101/288 |
| 27258 | 2/1983 | Japan ................................ 364/404 |
| 14371 | 1/1985 | Japan ................................ 364/404 |
| 2120821 | 12/1983 | United Kingdom ............... 101/288 |
| 2121576 | 12/1983 | United Kingdom ............... 101/288 |

*Primary Examiner*—William Pieprz
*Attorney, Agent, or Firm*—Oblon, Spivak, McClelland, Maier & Neustadt

[57] ABSTRACT

A label printer is disclosed adapted to establish and store therein a set of retrieval codes in which at least one condition of the various conditions of the place where each commodity is kept in stock is encoded and to issue labels in succession for each commodity whose item number satisfies the conditions of the retrieval code, whereby stock control of the commodities is enabled to be easily performed without preparing any special table or the like.

1 Claim, 5 Drawing Sheets

LABEL PRINTER

This application is a continuation of application Ser. No. 050,566, filed on May 18, 1987, now abandoned.

FIELD OF THE INVENTION AND RELATED ART STATEMENT

The present invention relates to a label printer for printing predetermined particulars in labels and issuing the same, and more particularly to that for issuing source marking labels.

In a label printer for issuing labels with information as to a commodity printed thereon, in general, an item number is established for each commodity and information necessary for controlling commodities is stored in a PLU memory according to the item number. What are stored in the PLU memory as necessary information for commodity control are, for example, commodity code, department code, number of issuance, price, etc. And, the item number is used for calling a specific commodity from the PLU memory and the commodity control is performed according to this item number.

From the point of view of difference in timing of issuance of the labels in the distribution process of commodities, they can be classified into two groups, the source marking label and the in-store marking label. Source marking labels are chiefly issued in whole sale houses to be stuck on the relative commodities and each label generally bears information on the relative commodity printed thereon in bar code. In addition to commodity control, the source marking labels are basically also used in retail trade. The in-store marking labels are issued in retail stores to be stuck on the relative commodities and bear information as to each commodity printed thereon generally in characters and numerals. The same has for its principal object the provision of information about the commodity for customers.

For the place issuing the source marking label such as, for example, whole sale houses, stocked conditions of commodities are items of information no less important than the commodity code, department code, number of issuance, and the price. Specifically, the greater is the variety and quantity of goods, the more importance for commodity control to have information as to conditions of goods in stock. The information as to the conditions of commodities in stock includes the order of articles in display, shelf number, gondola number, passage number, etc. As an example of keeping goods in stock, such a practice is being made that the articles are stored along different passages or in different gondolas according to their destinations of delivery or the commodities are displayed on different shelves or in different displaying orders according to categories of the commodities. Therefore, in the commodity control hitherto practiced, special tables concerning the order of display, shelf number, gondola number, passage number for each commodity are separately prepared for the controlling purpose using the item number of each article.

Problems encountered in such prior art will be described below. From an ideal viewpoint, since the item number is used, it is desired that all items of information concerning each specific item number are stored in the PLU memory. However, no information is stored in the PLU memory as to conditions of goods in stock, but special tables are only prepared separately for the purpose of commodity control. Therefore, there is such a disadvantage that the preparation of the tables themselves, as well as the commodity control referring to the tables, is quite troublesome. In addition, errors are liable to be produced due to misentry in the table and misreading of the contents.

OBJECT AND SUMMARY OF THE INVENTION

A first object of the present invention is to provide a label printer facilitating the commodity control based on information as to conditions of the commodities in stock.

A second object of the present invention is to provide a label printer of automatically issuing a predetermined number of sheets of labels without requiring any setting operation at the time of the label issuance.

In order to achieve the above mentioned objects, the label printer according to the present invention is adapted such that retrieval codes are established by encoding at least one of the various conditions of the place where commodities are stocked, and stored in the PLU memory, and labels are issued in succession for each commodity having the item number satisfying the conditions of each of the retrieval codes. Therefore, the commodity control of goods becomes easier.

DESCRIPTION OF THE PREFERRED EMBODIMENTS

Figure 1:
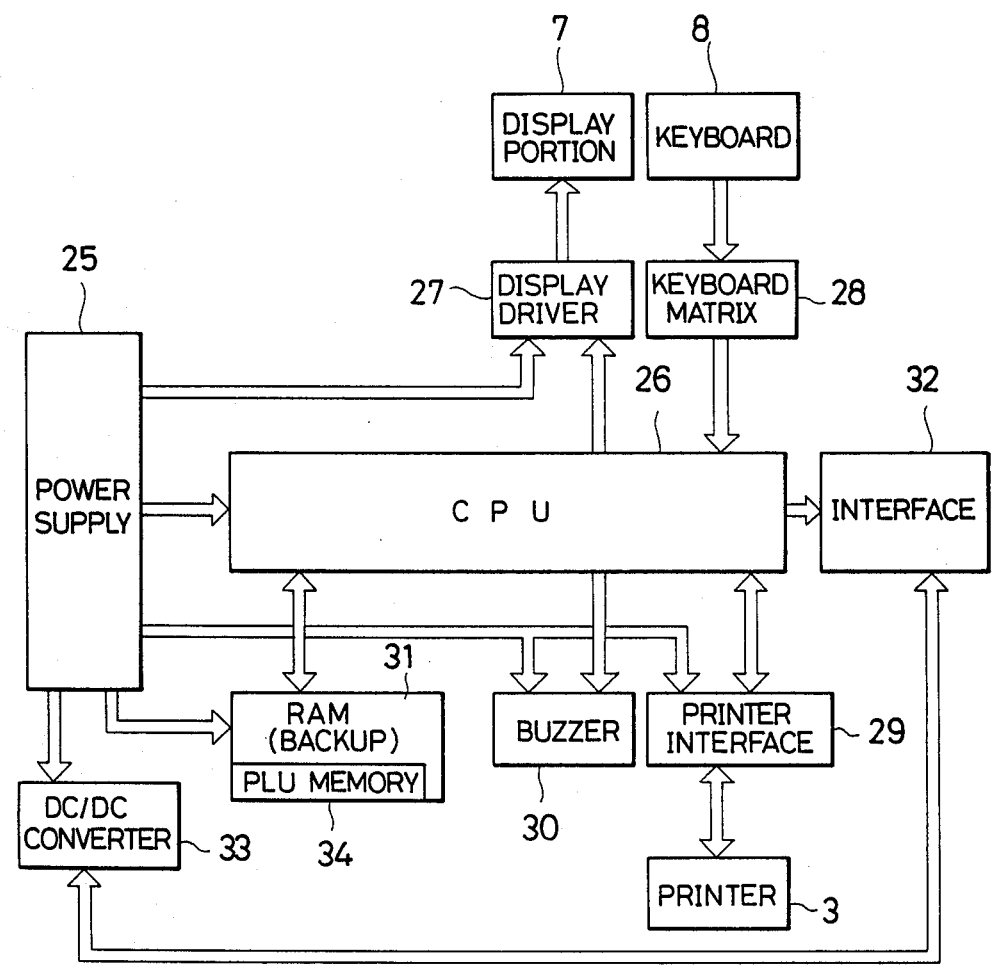
FIG. 1 is a block diagram showing electrical connections in an embodiment of the present invention.
Figure 2:
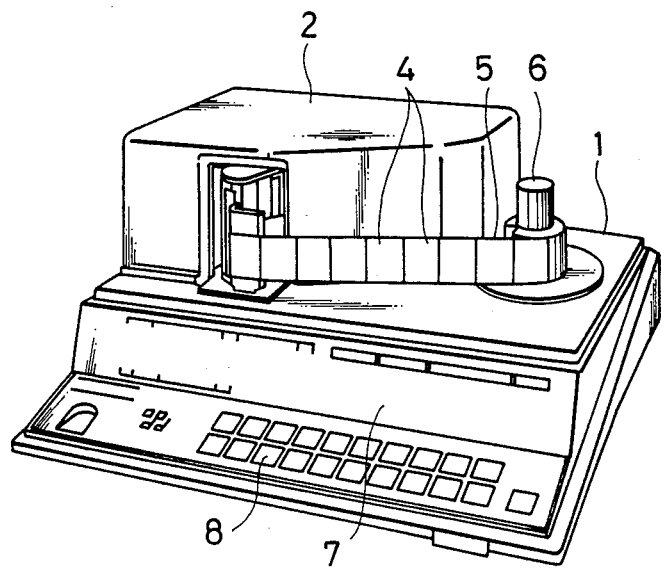
FIG. 2 is a perspective view of the whole body of a label printer.
Figure 3:
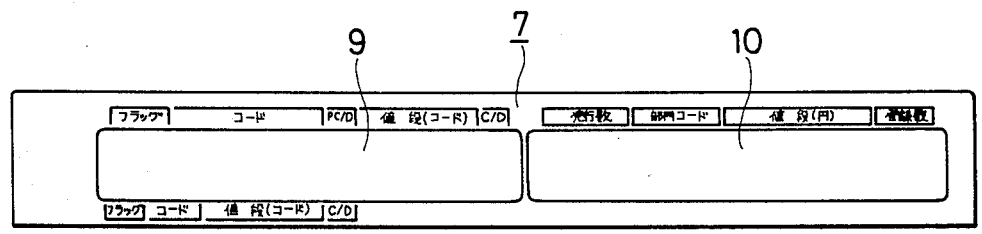
FIG. 3 is a front view of a display portion.
Figure 4:
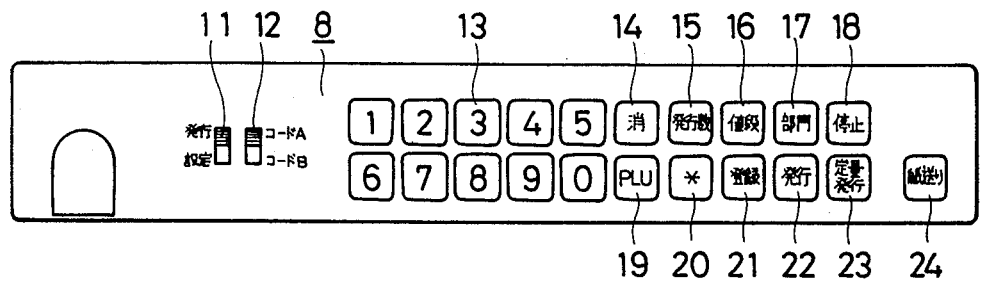
FIG. 4 is a plan view of a keyboard.

A preferred embodiment of the present invention will be described with reference to FIG. 1 to FIG. 7. There is provided a printer 3 on the top face of the case 1 covered by a cover 2. Within the cover 2, there is contained an elongate mount 5 with a plurality of labels pasted thereon and wound into a roll. And on the top of the case 1, there is set up a winding shaft 6 for winding the mount 5 with the printed labels 4 pasted thereon round the same.

There is provided a display portion 7 on the front face of the body case 1 and a keyboard 8 is disposed in front of the case. The display portion 7 is formed of a bar code display portion 9 and a data display portion 10. The bar code display portion 9 is able to display either of the 8-digit A bar code and 13-digit B bar code and is provided with two kinds of guide indications at the upper and lower sides thereof. The data display portion 10 is such as is capable of displaying number of issuance, department code, price, number of registrations, etc. A mark to indicate the display positions is provided at the upper side thereof. On the other hand, in the keyboard 8, there are disposed an issue/set key 11 for switching between issue mode and set mode, code A/code B key 12 for switching between code A and code B, numeric keys 13, cancel key 14, number of issuance key 15, price key 16, department key 17, stop key 18, PLU key 19, execute key 20, register key 21, execute key 22, fixed quantity tissue key 23, and a paper feed key 24.

The state of electrical connections will be described according to FIG. 1. A CPU (central processing unit) 26 is connected to a power a supply 25, and to the CPU 26 are connected the display portion 7 through a display driver 27, the keyboard 8 through a keyboard matrix 28, and the printer 3 through a printer interface 29, and to the same is also connected a buzzer 30 which makes an alarm on such occasions as an operational error has been made. And the display driver 27, printer interface 29, and the buzzer 30 are connected to the power supply 25.

Figure 5:
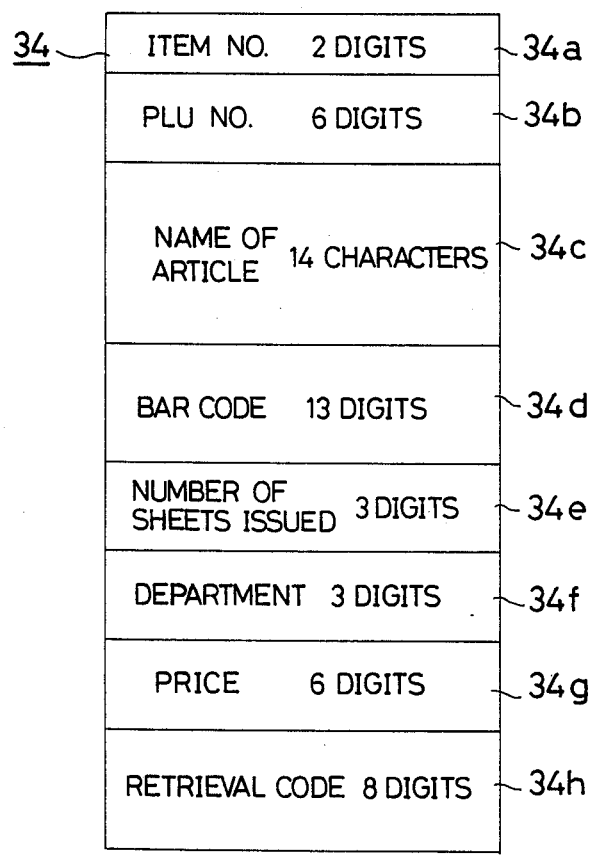
FIG. 5 is a diagram showing a memory map.
Figure 6:
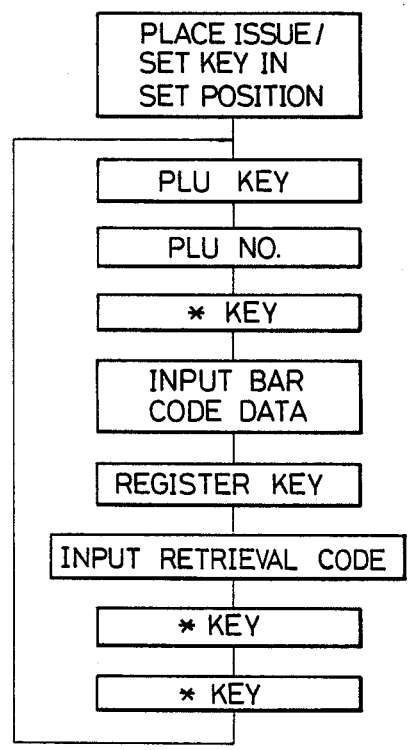
FIG. 6 is a flow chart showing a procedure for establishing the retrieval code.

Further, to the CPU 26 connected with the power supply 25 is connected a RAM 31. This RAM 31 includes a PLU memory 34 as well as a backup memory. The memory map of the PLU memory 34 is as shown in FIG. 5. The PLU memory 34 stores therein commodity item numbers 34a, PLU numbers 34b, article names 34c, bar code data 34d, numbers of sheets issued 34e, department codes 34f, prices 34g, retrieval codes 34h, etc. Therein, the item number 34a is given in 2 digits, PLU number 34b in 6 digits, article name 34c in 14 characters, bar code data 34d in 13 digits, number of sheets issued 34e in 3 digits, department code 34f in 3 digits, price 34g in 6 digits, and the retrieval code 34h is given in 8 digits.

The CPU 26 is also connected with an interface 32 for connection with an external circuit and this interface 32 is connected with the power supply 25 through a DC/DC converter 33.

With the above described arrangement, the retrieval code 34h concerning the conditions of commodities in stock such as, for example, the order of display, shelf number, gondola number, and passage number are established in advance. Below, the process of establishing the retrieval code 34h will be described with reference to FIG. 6. First the issue/set key 11 is placed in the set position and the PLU key 19 is operated, whereby the PLU number setting mode is selected. By inputting the PLU number 34b with the ten-key 13 and operating the execute key 20, the setting of the PLU number 34b is finished, and the mode is then turned to the bar code data input mode. By the way, the PLU number 34b is not a number similar to the item number 34a of an article or the like but one used for configuring of the PLU memory 34.

Then, data to be referred to by the bar code are input with the ten-key 13. The data about the bar code include various items such as the item number 34a, number of sheets issued 34e, department code 34 and price 34g. Incidentally, the number of sheets issued 34e is the number of the labels 4 to be issued, but in fact it is nothing but the number of the articles in stock to which the labels issued are to be stuck. By pushing the register key 21, the data to be referred to by the bar code are established and the mode is turned to the retrieval code input mode.

In the retrieval code input mode, the retrieval code 34h is input by operating the ten-key 13. The contents of the same are the "order of display", "shelf number", "gondola number", and "passage number", each being input in 2-digit numerals in succession. More particularly, the "order of display" is established by the first 2 digits of the 8 digits constituting the retrieval code 34h, the "shelf number" is established by the next 2 digits, the gondola number" is established by the next 2 digits, and the "passage number" is established by the last 2 digits. At this time, space data are input to the portion of the retrieval code 34h which is not required to be established. After the retrieval code 34h has been input in the described manner, the execute key 20 is operated whereby the inputting of the retrieval code 34h is finished. By pushing the execute key 20 once again, the establishment of the PLU number 34b, bar code data 34d, and the retrieval code 34h is completed.

Figure 7:
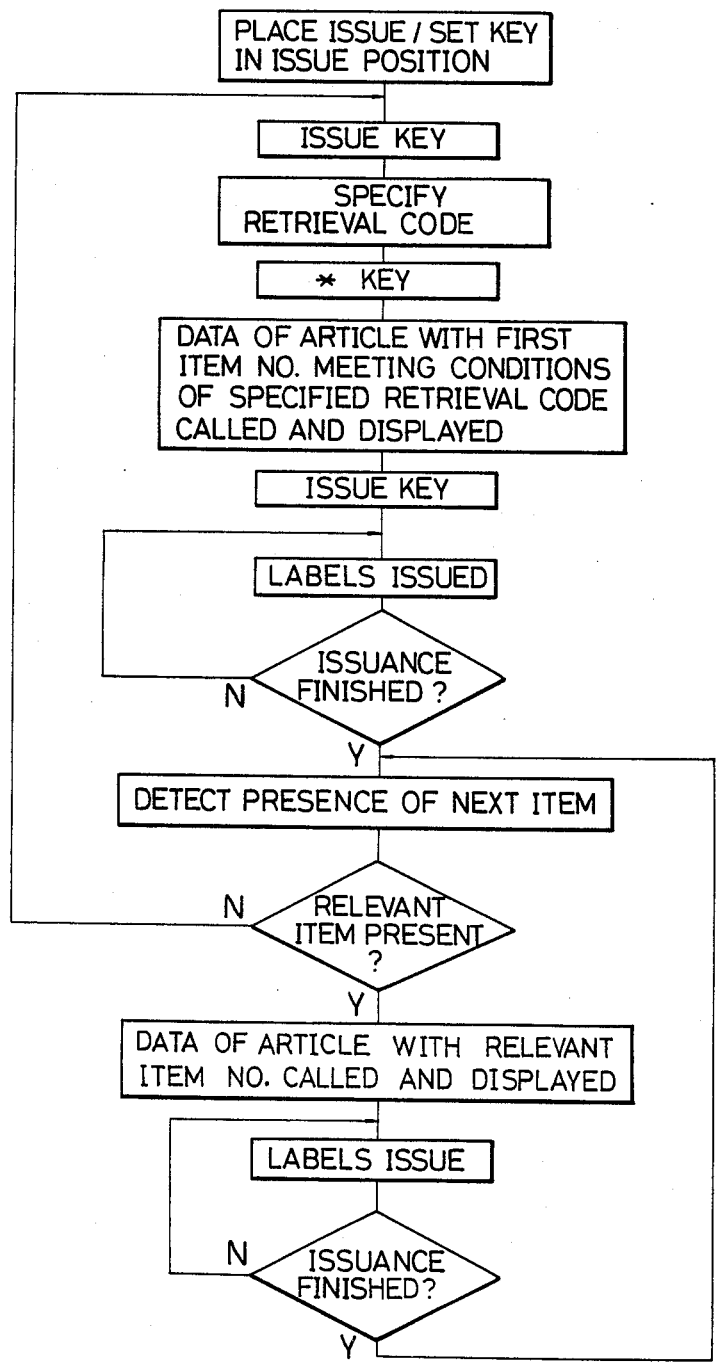
FIG. 7 is a flow chart showing a label issuing procedure.

Under the condition the retrieval code 34h has been established as described above, the label issuing process is executed for the article identified by the retrieval code 34h, which process will be described below with reference to FIG. 7. Firstly, the issue/set key 11 is placed in the issue position and the issue key 22 is pushed, whereby the retrieval code input mode is selected. The retrieval code 34h is then input with the ten-key 13. That is, the "order of display", "shelf number", "gondola number", and the "passage number" are input in 2-digit numerals in succession. By pushing the execute key 20 after such retrieval steps have been taken, the inputting of the retrieval code 34h is finished, and thereby, the data about the article having the item number 34a satisfying the conditions of the specified retrieval code 34h are called from the PLU memory 34 and displayed at the display portion 7. In the case where there are a plurality of item numbers 34a satisfying the specified retrieval code 34h, the data about the article having the lowest item number 34a are called. Incidentally, the data about an article include the bar code data 34d, department code 34f, the price 34g, etc., of which the bar code data 34d is displayed at the bar code display portion 9 and the rest are displayed at the data displaying portion 10. Then, by pushing the execute key 22 once again, the labels 4 for the article having the relevant item number 34a are issued in succession. The number of sheets then issued is just the number of sheets issued 34e established in the PLU memory 34 corresponding to the relative item number 34a.

When the issuance of the labels 4 for the article with the lowest item number 34 has been finished, it is detected whether the next item is present or not. If there is not present the next item, the sequence returns to the initial state of the issuance process. If there is present the relevant item, the data about the article with the relevant item number 34a are called and displayed at the display portion 7 and the labels 4 corresponding to the number of sheets issued 34e established for the relative article are issued. After the issuance, presence of the next item is detected again and a similar routine is repeated. In the described manner, the labels 4 for all the articles satisfying the conditions of the retrieval code 34h established in the PLU memory 34 are issued.

In inputting the retrieval code 34h, a single item may be input. For example, if the retrieval code 34h only for the displayed passage is input, the articles with the item numbers 34a displayed along that passage are called in succession irrespective of the article numbers or the like and labels 4 for the articles are issued.

What is claimed is:

1. A label printer comprising:
   a central processing unit;
   a keyboard comprising means for inputting data to the central processing unit;
   a printer unit comprising means for outputting data from the central processing unit;
   a display unit for displaying data from the central processing unit; and
   a random access memory connected to said central processing unit, said memory having PLU memory means including:
   (a) means for storing commodity item numbers, (b) means for storing PLU numbers,
(c) means for storing commodity names,
(d) means for storing bar code data,
(e) means for storing a number of sheets issued from the printer unit,
(f) means for storing department codes,
(g) means for storing commodity prices, and
(h) retrieval storage means for storing commodity retrieval codes comprising data for the conditions of the place where each commodity is physically located, including the order of display, shelf number, gondola number, passage number and the number of said commodities located at said place, said retrieval storage means enabling said printer unit to print and issue labels including bar code, department code and price for commodities corresponding to a retrieval code inputted from said keyboard, whereby the labels may be printed and issued for commodities where only the conditions of the place where the commodity is physically located is known.

* * * * *